Dec. 17, 1968    C. P. KOLTHOFF, JR    3,416,624
TRACTOR DRIVE AND LOAD ARRANGEMENT
Filed Oct. 20, 1966
3 Sheets-Sheet 2

INVENTOR
C. PAUL KOLTHOFF, JR
Floyd B. Harman
ATTY

Dec. 17, 1968  C. P. KOLTHOFF, JR  3,416,624
TRACTOR DRIVE AND LOAD ARRANGEMENT
Filed Oct. 20, 1960  3 Sheets-Sheet 3
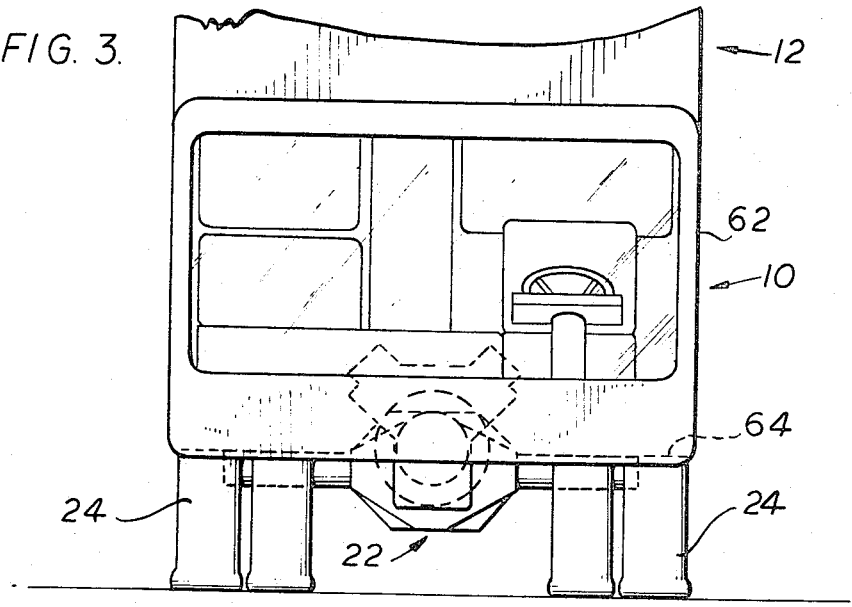
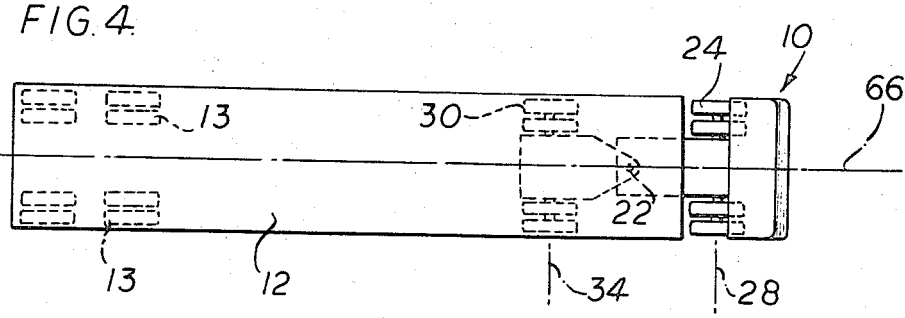
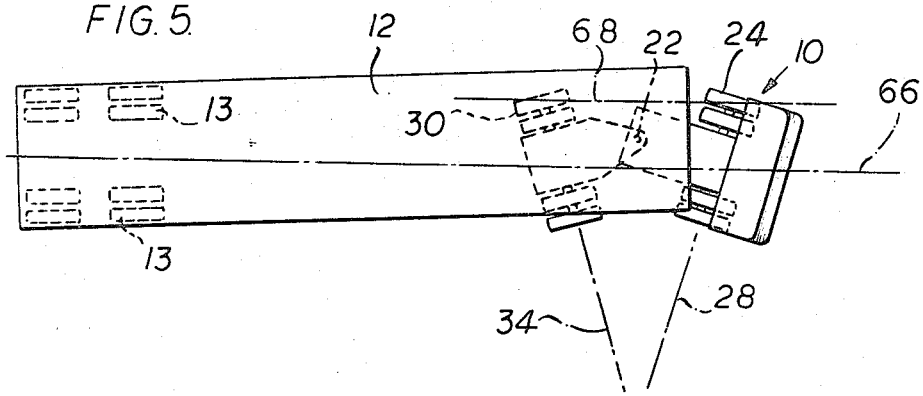
INVENTOR
C. PAUL KOLTHOFF, JR
ATTY United States Patent Office 3,416,624
Patented Dec. 17, 1968

3,416,624
TRACTOR DRIVE AND LOAD ARRANGEMENT
C. Paul Kolthoff, Jr., Naperville, Ill., assignor to International Harvester Company, Chicago, Ill., a corporation of Delaware
Filed Oct. 20, 1966, Ser. No. 588,189
10 Claims. (Cl. 180—14)

ABSTRACT OF THE DISCLOSURE

A motor truck tractor, for supporting a portion of a load-carrying trailer, having two major sections hinged together about a vertical axis pivot therebetween for power-actuated articulated steering thereof. The tractor includes a fifth wheel member positioned coextensive with the vertical pivot axis for supporting the forward end of the trailer which distributes the load uniformly on the tractor's ground engaging wheels. The rear section of the tractor is propelled through a hydraulic transaxle connected to the rearward end of the engine's output shaft and the front section of the tractor may be propelled through a substantially identical second transaxle connected to the forward end of the engine's output shaft whereby all ground engaging wheels are driven.

---

The present invention relates to a tractor, load and drive.

A broad object of the invention is to provide a novel construction including a tractor, a load supported and drawn by the tractor, and a drive for the tractor.

A more specific object to provide a relatively simple construction which renders practical the use of an articulated steering, full powered tractor with drive in all wheels, such as "4 x 4," in conjunction with a load such as a trailer which is at least partially directly supported on the tractor.

Another object is to provide a tractor of the foregoing character which is adapted for operation with conventional trailers.

Advantages resulting from the construction include reduced length of the tractor and trailer combination; less tire wear; fewer parts, and simpler construction of those parts that are required.

Other advantages are the utilization of identical transaxles in the tractor; the capability of placing the load more forwardly on the tractor, resulting in greater efficiency, and also working toward the reduced length referred to above; and the possibility of placing the cab in a lower position and providing a flat floor therein.

Another and principal object of the invention is to provide a novel engine and drive arrangement.

A more specific object is to provide such an engine and drive arrangement in which a single engine is utilized and a drive developed at both of opposite ends of the engine.

An additional object is to provide an engine of the character referred to, and drive arrangement, wherein separate transmissions are provided for the front and rear axles of the tractor. A more specific object is to provide a construction of the character just referred to in which complete transaxles are provided for the front and rear wheels, each combining the transmission, differential, and axle functions, resulting in a much simpler construction than has been possible heretofore and providing a more effective drive for a full powered, articulated steering construction.

Other objects and advantages of the invention will appear from the following detail description taken in conjunction with the accompanying drawings wherein:

FIGURE 2 is a side view of the tractor and a portion of a trailer, the forward end of which is mounted on the tractor;

FIGURE 3 is a front-view of the tractor and trailer;

FIGURE 4 is a small scale plan view of the tractor and trailer shown in straight longitudinally aligned position;

FIGURE 5 is a view similar to FIGURE 4 but with the tractor shown in angled steering position, and the trailer in a corresponding position displaced from the straight longitudinally aligned position.

Figure 1:
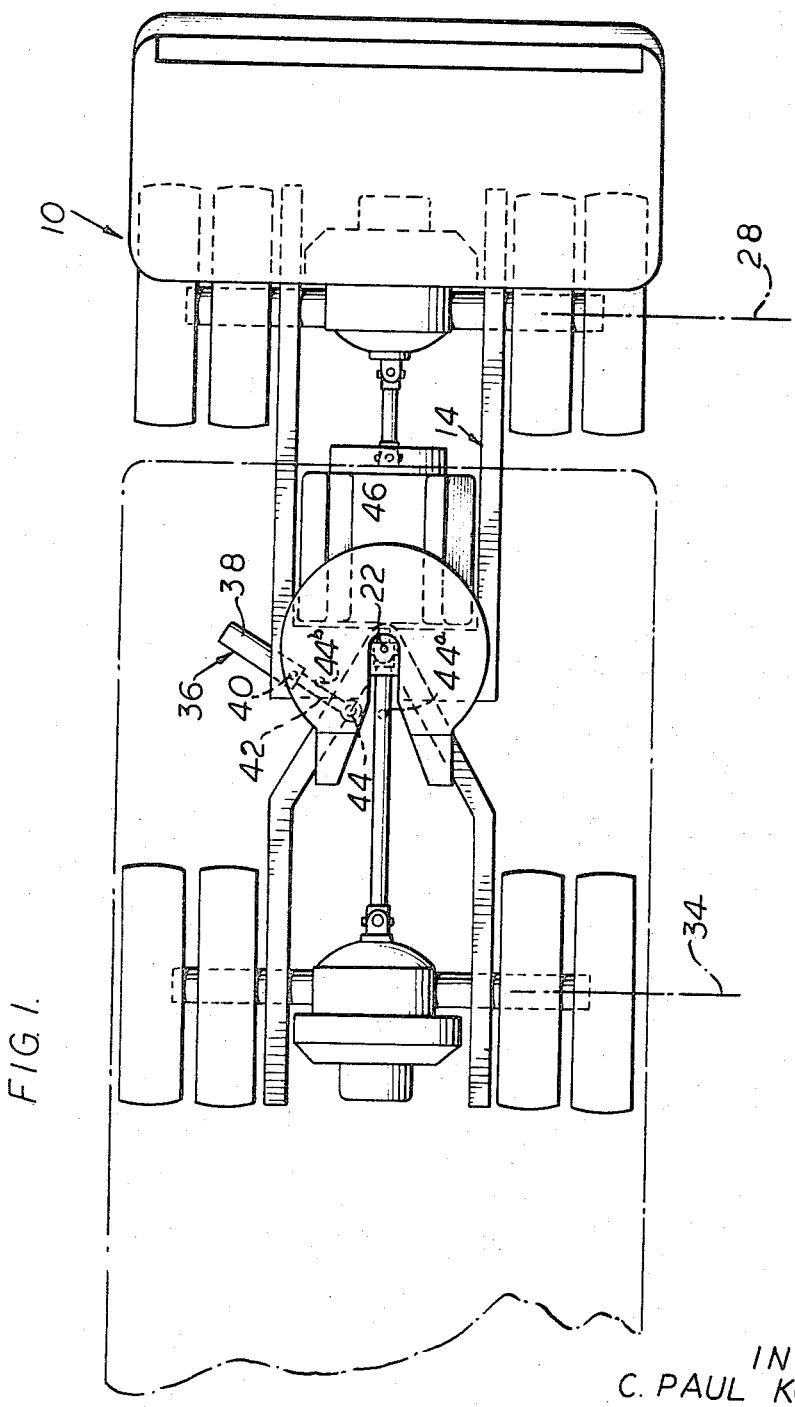
FIGURE 1 is a plan view of a tractor embodying the features of the present invention.

Referring now in detail to the drawings the tractor of the invention is indicated in its entirety at 10 and the trailer constituting a load drawn thereby, at 12 having trailing wheels 13. The tractor is of articulated steering construction, while the trailer is of a conventionally known type. The tractor includes a frame 14 made up of a front section 15 and a rear section 16 forming corresponding sections 17 and 18 of the tractor, the frame sections being pivotally secured together by pivot elements 20 on a vertical steering axis 22.

The front section 17 is provided with front wheels 24 on a transaxle 26 defining an axis 28, while the rear section 18 is provided with wheels 30 on a transaxle 32 defining an axis 34. These transaxles are identical in construction, preferably by hydrostatic character, each providing transmission, differential, and axle functions, each remaining fixed by springs and associated suspension members to its coorresponding section of the frame, maintaining the wheels thereon on their respective common axes, so that the wheels on each transaxle always remain on the same axis, as will be referred to again hereinbelow in the steering functions. The tractor is full-powered, all wheels being driven, the specific example disclosed being a "4 x 4" which designation as used by the trade means "four wheels—all driven by the tractor's engine."

The steering functions may conveniently be performed through the medium of a power device 36 (FIGURE 1) which is preferably hydraulic in nature having a cylinder 38 pivotally mounted at 40 on one of the frame sections and an extensible rod 42 pivoted at 44 on the other section. Upon extension and contraction of the power device, the frame sections pivot about the frame pivots 20, about pivot axis 22 and assume respective relatively angular positions in the steering operation, the pivot element 44 assuming positions 44a and 44b respectively.

The tractor is driven by a single power plant or engine 46, and in accordance with a principal feature of the invention, drive is taken from both ends of the engine for driving the corresponding front and rear wheels. Additionally the engine is preferably disposed entirely on one of the frame sections, in this case the front section, offset from the vertical steering axis 22. The engine is provided with a single or common output means 47 having output elements 48 and 50 aligned on a nominal drive-line axis 52 extending through the engine and aligned longitudinally of the tractor. (This output means 47 would be the crankshaft if a conventional piston engine were used.) A drive shaft 54 operatively interconnects the output element 48 and the front transaxle 26 while at the rear end of the engine and connected to the output element 50 is a constant velocity universal joint 56 preferably, but not necessarily, disposed on the vertical steering axis 22; another drive shaft 58 operatively interconnects the universal joint 56 and the rear transaxle 32.

Mounted on the frame 14, and on either of the sections thereof as may be practical is a fifth wheel construction 60 of suitable kind for supporting the trailer 12. Preferably, but not necessarily, the fifth wheel construction is disposed concentric with the steering axis 22. A cab 62 is mounted on the front end of the front section 15, and because of the constant relation between the front wheels and the front frame section, greater efficiency can be realized in utilizing the space at the front end of the tractor and the cab can extend full forwardly of the tractor frame and wheels, enabling the positioning of a flat floor 64 positioned relatively low.

In the steering operation each set of wheels, i.e., the front and the rear wheels, remain substantially in their original position relative to the ground, but rotate about their center as the frame sections swing to relatively angular positions, resulting in the steering axis 22 swinging or shifting transversely of the original longitudinal alignment axis 66 of the tractor 10. In this movement, the load carried by the tractor, i.e., the front end of the trailer, shifts correspondingly laterally, this change in relationship being shown as between FIGURES 4 and 5. In FIGURE 4 the sections of the tractor are aligned longitudinally and the trailer is aligned therewith, as indicated by the central axis 66. When the sections of the tractor are shifted angularly in the steering operation, as just referred to, the extent of the lateral shifting of the steering axis 22 is determined by the compound movements of both the front and rear wheels, the wheels shifting ahead on the outside and backwardly on the inside. The movements are also controlled by the interconnection of the two sections. The front end of the trailer shifts laterally correspondingly so that the trailer as a whole is shifted angularly out of alignment with the axis 66.

When the tractor is in full forward alignment as shown in FIGURE 4, its movement is straight and without variations; when it is shifted to a steering position as shown in FIGURE 5, the axes 28, 34 of the transaxles converge to a point forming the center of curvature of the arc which the tractor follows when in such steering position. The trailer follows the tractor in accordance with the trailing movement of the free wheels 13 of the trailer. Preferably the relation between the parts is such that the steering axis 22 in its outermost position is within a line 68 through the outer wheels of the tractor.

The mounting of the front end of the trailer over the tractor in such a manner as to enable both sections of the tractor to swing angularly results in a much simpler construction which enables the provision of a more simplified drive construction in all of the tractor wheels. The arrangement enables similar angular movement of the tractor sections whereby the front wheels may be powered by a transaxle of the same kind as that used in the rear, eliminating the elaborate and expensive construction heretofore used in which the front wheels in the steering operation were shifted angularly relative to the axle on which they are mounted. The present construction involves fewer parts than were required heretofore, and a much simpler construction is involved in utilizing those parts that are required.

Another advantage of the invention is that the overall length is less than heretofore, since the trailer extends well forwardly onto the tractor. An additional advantage is that there is less tire wear because the wheels of the tractor assume perfect alignment in their arcs in the steering movements. A further advantage resides in the simplicity in construction of the drive line from the engine to the wheels, there being substantial identity in both ends of the drive line from the engine, i.e., the drive shafts leading to identical transaxles. The drive shafts, for example, are in a straight line, eliminating the necessity for additional gear boxes, etc., for relocating or changing the direction of drive from the engine to the two sets of wheels.

As noted above, the transaxles 26 and 32 may be of any desired type, such as that disclosed in U.S. Patent No. 1,136,363 to W. B. Pepper, providing a simple form of transmission and differential action. There is only required a single drive line from the engine to both sets of wheels. Of course if it is desired not to drive the front wheels from the engine a conventional non-drive axle may be substituted for the transaxle 26.

The utilization of both ends of the single output member (or crackshaft) of the engine for transmitting drive in opposite directions provides an extremely simple construction.

A further advantage resides in greater stability that can be attained in the use of a tractor of this type. In previous tractors the greater portion of the weight imposed thereon was placed on the rear driving wheels, the center of the weight of the load, or trailer, being placed more rearwardly particularly in the case of 6 x 4 tractors having two rear driving axles. Consequently, the tractor was not perfectly balanced with respect to front-to-rear distribution. In the present instance since both the front and rear wheels are of the same character, i.e., the same construction, and both being driving wheels, the load is imposed on both the front and rear wheels equally, resulting in more uniform action in the front and rear sections of the tractor in the turning or steering movements, as well as in straight forward movements.

What is claimed is:

1. The combination of an articulated tractor supporting at least the forward end portion of a load-carrying trailer comprising a front frame section of said tractor pivotally connected at a vertical steering axis to a rear frame section of said tractor, at least one pair of ground engaging wheels on an axis common to both of said frame sections for supporting each of said frame sections, a power plant including power transmission means drivingly connected to at least one pair of said ground engaging wheels for propelling said tractor, power operated steering means positioned to displace angularly said front frame section with respect to said rear frame section about said vertical steering axis for articulately steering said tractor, and a fifth wheel means mounted on at least one of said frame sections coextensively with said steering axis for pivotally supporting at least the said forward end portion of said trailer whereby said tractor steerably propels said trailer and the load of said trailer supported by said tractor is distributed substantially uniform among said ground engaging wheels.

2. An articulated tractor and trailer combination according to claim 1 wherein said power transmission means includes a transaxle drivenly connected to said power plant and in drive relation with a pair of said ground engaging wheels.

3. An articulated tractor and trailer combination according to claim 1 wherein said power transmission means includes a transaxle positioned in said rear frame section drivenly connected to said power plant and drivingly connected to a pair of ground engaging wheels on said rear frame section.

4. An articulated tractor and trailer combination according to claim 1 wherein said power operated steering means includes a hydraulic motor positioned to displace angularly said front frame section with respect to said rear frame section about said pivotal connection for articularly steering said tractor.

5. An articulated tractor and trailer combination according to claim 1 wherein said power transmission means includes a first transaxle on said front frame section drivenly connected to a forwardly extending output shaft on said power plant for driving a pair of ground engaging wheels on said front frame section and a second transaxle on said rear frame section drivenly connected to a rearwardly extending output shaft on said power plant for driving a pair of ground engaging wheels on said rear frame section.

6. A vehicle of the character disclosed comprising, in combination, a tractor having a frame including front and rear sections, each frame section including a transaxle fixed therein and ground engaging wheels on a corresponding constant axis thereof, the sections being pivotally interconnected on a vertical steering axis between the transaxles, means for relatively swinging the frame sections about said steering axis, means for driving all of the wheels through said transaxles, and a load pivotally secured to the frame coextensive with said steering axis, said vertical steering axis being positioned longitudinally between the front and rear wheels and fixed against movement transversely of the frame, but the load being movable transversely of the frame at all other points longitudinally of its point of securement.

7. The invention according to claim 6 wherein the load is a trailer having its front end mounted on the tractor, a fifth wheel is provided on the tractor supporting the front end of the trailer on an axis coincident with said steering axis, and the trailer is provided with wheels at its rear end.

8. The invention according to claim 6 wherein the driving means includes a single engine mounted on the frame, and drive shafts interconnecting the engine and the respective transaxles said engine having a common output means with output elements at opposite ends thereof on a common axis, and the drive shafts are drivingly connected with said output elements.

9. The invention according to claim 8 wherein the engine is mounted entirely on one of the sections and movable therewith in the steering actions of the tractor, and a universal joint is operatively interposed between the engine and the drive shaft to the transaxle in the other section.

10. The invention according to claim 6 wherein the steering axis is midway between the front and rear wheels and the load is pivotally supported on the frame on a vertical axis coincident with said steering axis whereby the load is distributed substantially equally between the two sections of the tractor.

References Cited

UNITED STATES PATENTS

| | | | |
|---|---|---|---|
| 1,136,363 | 4/1915 | Pepper | 60—53 |
| 1,853,058 | 4/1932 | Johnson | 180—49 |
| 2,317,972 | 5/1943 | Ash | 180—14 |
| 2,595,594 | 5/1952 | Martin | 180—50 |
| 3,057,319 | 10/1962 | Wagner. | |
| 3,236,325 | 2/1966 | Garrett | 180—51 |
| 3,282,367 | 11/1966 | Mathew et al. | 180—51 |

KENNETH H. BETTS, *Primary Examiner.*

U.S. Cl. X.R.

180—51